Dec. 3, 1935.    H. M. BIEBEL    2,023,113
RANGE CONTROL SYSTEM
Filed March 30, 1934    2 Sheets-Sheet 1

WITNESSES:

INVENTOR
Herman M. Biebel.
BY
ATTORNEY

Dec. 3, 1935.   H. M. BIEBEL   2,023,113
RANGE CONTROL SYSTEM
Filed March 30, 1934   2 Sheets-Sheet 2
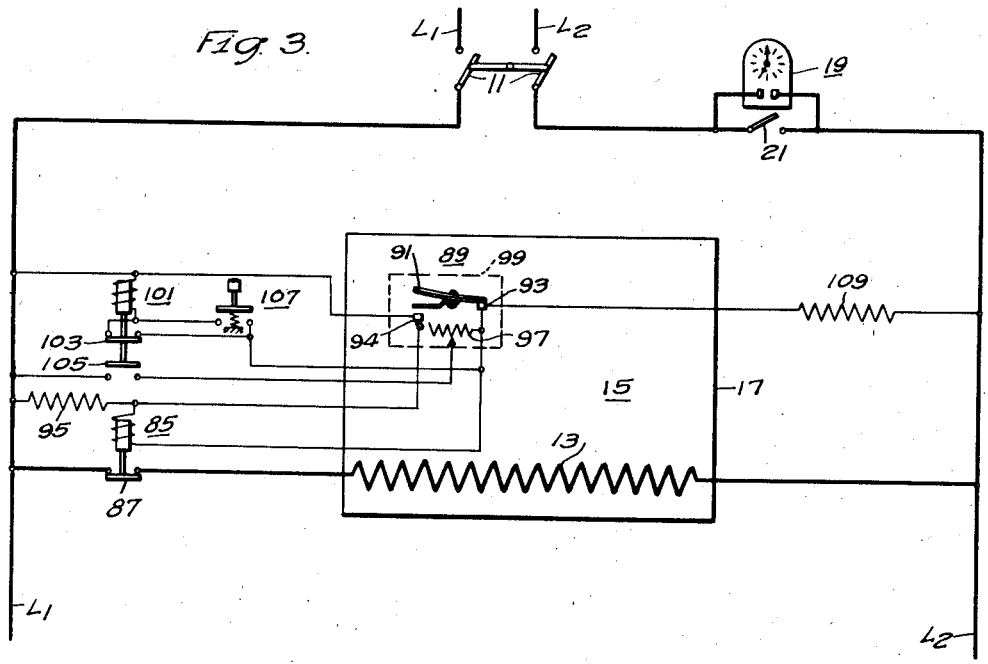
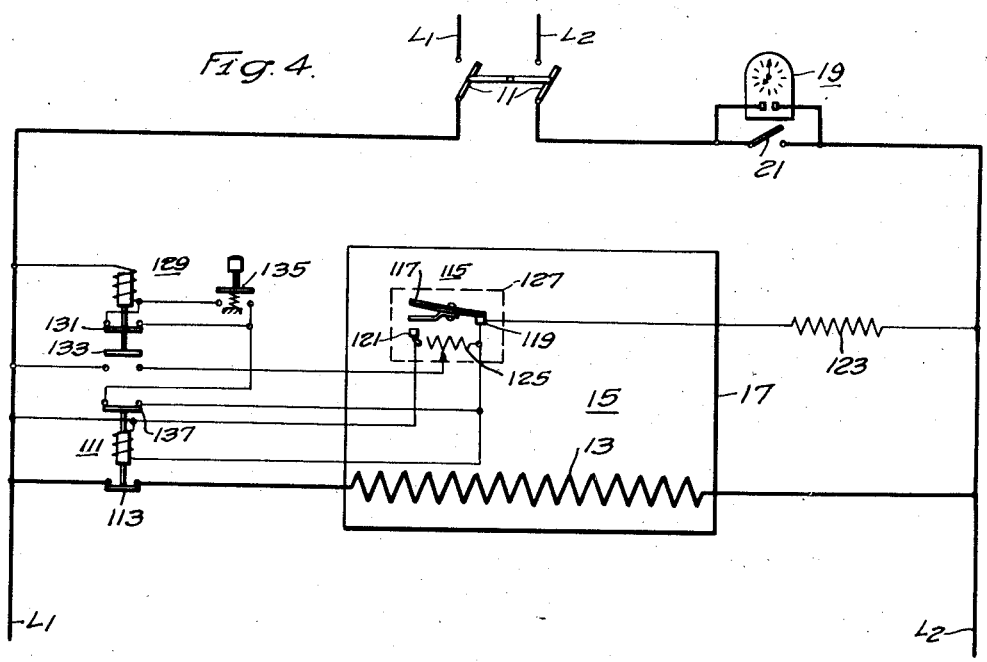
WITNESSES:
E. A. McCloskey
Wm. C. Groome
INVENTOR
Herman M. Biebel.
BY W. R. Coley
ATTORNEY Patented Dec. 3, 1935

2,023,113

UNITED STATES PATENT OFFICE 2,023,113

RANGE CONTROL SYSTEM

Herman M. Biebel, Oakmont, Pa., assignor to Westinghouse Electric & Manufacturing Company, East Pittsburgh, Pa., a corporation of Pennsylvania Application March 30, 1934, Serial No. 718,272

8 Claims. (Cl. 219—20)

My invention relates to electric ranges and particularly to thermo-electric temperature control systems therefor.

An object of my invention is to provide a relatively simple, inexpensive, easily-installed and readily operated system for controlling the temperature of a cooking chamber.

Another object of my invention is to provide a relatively simple temperature-control system to be operatively associated with a cooking chamber, whereby any one of a number of different temperature cycles may be obtained at the will of an operator.

Other objects of my invention will either be apparent from the following description of the system and of its operation, or will be specifically pointed out hereinafter.

In practicing my invention, I provide in combination with a cooking chamber and a heating element therefor, a contactor for controlling the energization of the heating element, a thermal switch for controlling the energization of the contactor coil, which thermal switch is in heat-receiving relation with the cooking chamber and the heating element therein and a modifying element for the thermal switch in the shape of an adjustable resistor constituting an auxiliary source of heat for the thermal element, together with means for controlling the energization of the auxiliary heating element.

Reference is here made to my copending applications, relating to similar subject matter, Serial Nos. 718,273, 718,274, 718,275, 718,276, 718,277, and to an application by F. S. Wheeler Serial No. 718,278, filed as of even date herewith.

In the drawings,

Fig. 3 is a diagram of connections of a further modification embodying my invention; and Fig. 4 is a diagrammatic representation of a further modification of a system embodying my invention.

As my improved system of temperature control is particularly applicable to the ovens of electric ranges, it may be well to set forth briefly its points of novelty and what is accomplished thereby.

In the roasting of meats, it is usual for an operator to initially subject the meat to a relatively high temperature, which may be on the order of 500° F., in order to sear the same whereby the juices are prevented from leaving the piece of meat during subsequent cooking operations effected at a lower temperature, say, on the order of 300° to 400° F., which temperature is maintained substantially constant for a sufficient length of time to cook the meat to the desired degree. All that is necessary with regard to the searing temperature is that it be applied for a very short time only, substantially momentarily being effective for the desired purpose, and my improved system, therefore, permits of obtaining primarily a momentary peak temperature followed by a lower sustained temperature or of obtaining a lower sustained or maintained temperature only, which latter temperature cycle may be used for boiling or the baking of foods other than roasts.

It is found highly desirable to utilize a thermo-electric system, that is, one in which a thermally-actuable switch is located in heat-receiving relation with the cooking chamber so that the thermal element will operate in accordance with the amount of heat generated in the heating element, and, in addition to the design constants of the oven walls, will recognize, so to speak, the amount of food located in the cooking chamber and more particularly the weight of a roast of meat to be cooked. It is obvious that if a predetermined amount of electric energy is transformed into heat by a heating element, a thermal element in the cooking chamber will reach a certain temperature quicker when a small amount of food is located in the cooking chamber than when a larger amount of food is located therein.

Figure 1:
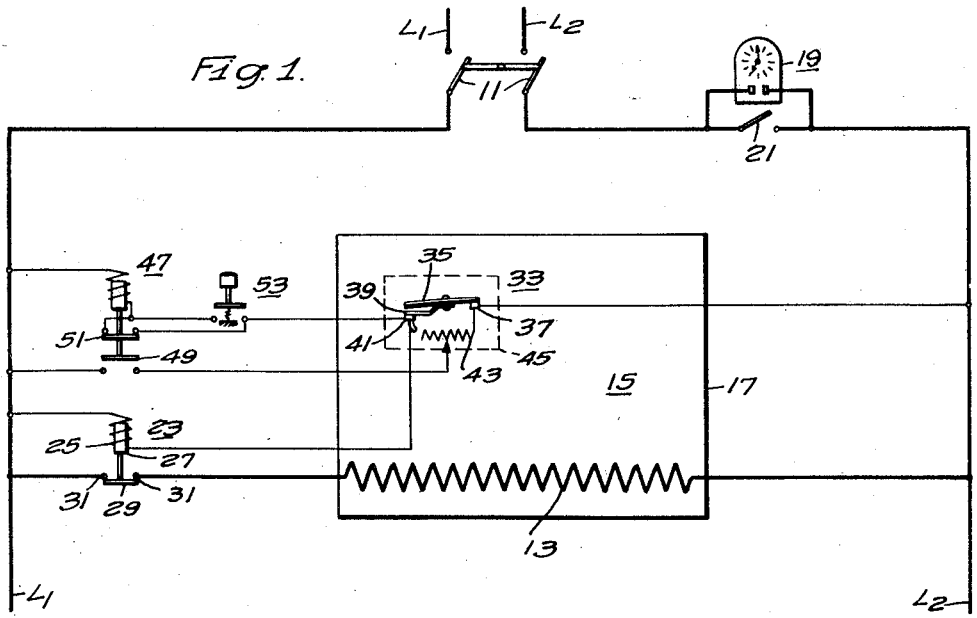
Figure 1 is a diagrammatic representation of a system embodying my invention.

Referring first to Fig. 1 of the drawings, I have illustrated a supply circuit including conductors L1 and L2, a main manually-actuable switch 11 utilized for controlling primarily the energization of a heating element 13 located in an oven or cooking chamber 15 defined by a plurality of oven walls 17. As the details of construction and location of the heating element and of the walls 17 constitute no part of my present invention, these are shown schematically only, and it is to be understood that any suitable or desired heating element and oven wall structure may be utilized in a manner now well known in the art.

As it may be desirable under certain circumstances to utilize a time control for the energization and deenergization of the heating unit, I may provide a clock-controlled switch mechanism 19, and in order to be able to control the circuit independently of device 19, I may provide a manually-actuable switch 21 connected in parallel circuit relation to the switching contacts of device 19.

Control of the energization of heating element 13 is effected by a contactor 23 including an actuating coil 25, a movable armature core 27 having operatively associated therewith a contact bridging member 29 adapted to engage with and be disengaged from fixed contact members 31 connected in series circuit with heating element 13 in a manner well known in the art and substantially as shown in the drawings.

Means for controlling the energization of the actuating coil 25 includes a thermal switch 33 comprising, for example, a bimetal strip 35 having one end thereof fixed to a contact terminal 37 with the other end thereof free to move in response to variations in the temperature of cooking chamber 15. The design and construction of the thermal switch 33 is such that a spring contact thereon, designated by numeral 39, remains in engagement with an adjustable contact member 41 until a temperature of substantially 500° F. has been reached in either the thermal element 35 or in a predetermined part of the cooking chamber 15.

The thermal switch 33 is connected by suitable conductors in series circuit relation with actuating coil 25 and across the supply circuit conductors L1 and L2, assuming, of course, that switch 11 and, say, switch 21 are closed. It is obvious that with the system energized as set forth above, the actuating coil 25 will be energized at all temperatures of the cooking chamber 15 up to substantially 500° F., this value, of course, depending upon the adjustment of contact member 41.

Means for modifying the action of bimetal element 35 is provided in the form of a small auxiliary heating coil 43 located in heat-exchanging relation with element 35, and in order to obtain the proper effect of auxiliary heating element 43 on the thermal element 35, I prefer to locate the two elements in a suitable small casing 45, which, of course, may be utilized to properly support the contact terminals, the thermal element and the auxiliary heater. I prefer to make the auxiliary heater adjustable, as is indicated schematically in the drawings.

Means for enabling an operator to render the auxiliary heating element 43 effective or ineffective under certain operating conditions comprises an auxiliary contactor 47 which includes the usual actuating coil, a movable armature core, and two contact bridging members 49 and 51, respectively, which are adapted to cooperate with fixed contact members in a manner well known in the art. A manually actuable "start" type of switch 53 is provided which permits of an operator momentarily closing an energizing circuit through the actuating coil of contactor 47, the bridging member 51 thereafter cooperating with its fixed contact members to provide a holding circuit for the contactor 47 in a manner well known in the art. It may be here set forth that the system of Fig. 1 of the drawings is one in which the thermal switch 33 itself controls both the main contactor 23 and the auxiliary contactor 47.

It is further evident from an inspection of Fig. 1 of the drawings that when the actuating coil of contactor 47 is deenergized, the auxiliary heater 43 is energized by the engagement of the bridging member of contactor 47 with its fixed contacts connected in circuit with the auxiliary heating element 43, and when the actuating coil of contactor 47 is energized and the parts thereof are in the position shown in Fig. 1 of the drawings, the auxiliary heater 43 is deenergized.

Figure 2:
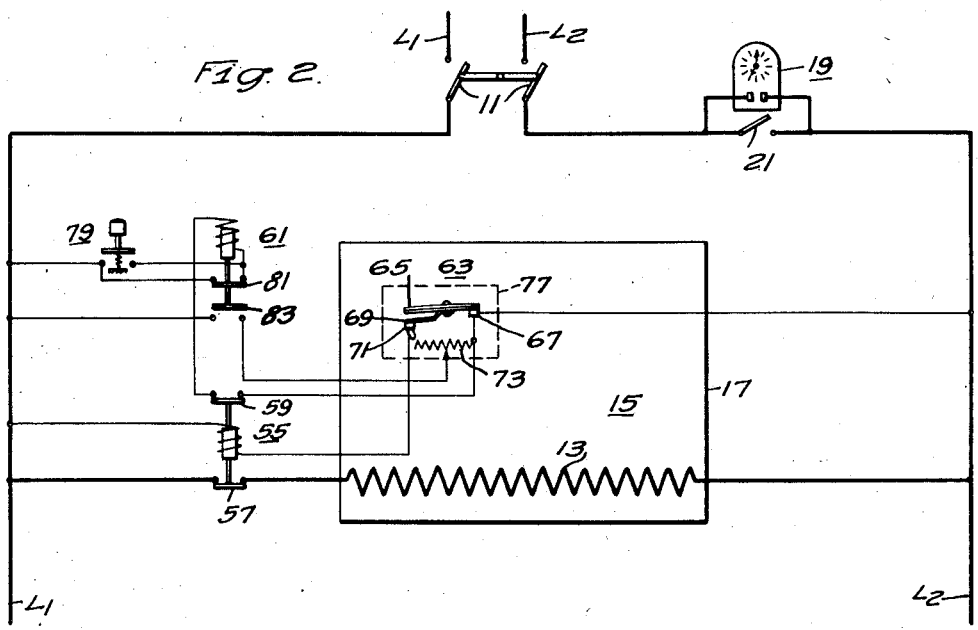
Fig. 2 is a diagrammatic representation of a modified form of system embodying my invention.

Referring now to Fig. 2 of the drawings, I have there illustrated a modified system, embodying my invention, which distinguishes mainly from the system shown in Fig. 1 of the drawings in that a somewhat different form of main contactor is employed, the main contactor controlling the auxiliary contactor.

The system includes a main contactor 55 having the usual actuating coil and two contact bridging members 57 and 59, contact bridging member 57 cooperating with fixed contact members to control the energization of heating element 13, while contact bridging member 59 cooperates with fixed contact members to control the energization of the actuating coil of an auxiliary contactor 61.

Means for controlling the contactor 55 includes a thermally actuable switch 63 which may comprise a bimetal strip 65 having one end thereof fixedly mounted on a contact terminal 67, while the other end thereof is provided with a resilient contact spring 69 which is adapted to engage with and be disengaged from a substantially fixed but adjustable contact terminal 71. This thermal switch 63 is also of the type wherein elements 69 and 71 remain in engagement until a peak or maximum temperature on the order of 500° F. is obtained either in the element 65 or in the cooking chamber 15.

A modifier in the form of a small auxiliary heater 73 is provided in heat-transmitting relation to the thermal element 65, and in order to insure proper cooperation of elements 73 and 65, I prefer to locate them in a suitable casing 77, which casing may be utilized to support the various elements of the thermal switch 63.

A "start" type of manually closable switch 79 is provided, and is so connected in circuit with the actuating coil of contactor 61 that a momentary closure thereof will energize the actuating coil, whereupon contact bridging member 81 of contactor 61 will cooperate with fixed contact members to provide a holding circuit for the actuating coil in a manner well known in the art. The second contact bridging member 83 of contactor 61 controls the circuit of adjustable heating element 73, heating element 73 being deenergized when contactor 61, and particularly its actuating coil, is energized.

Referring now to Fig. 3 of the drawings, I have there illustrated a further modification of a system embodying my invention in which the method of operation of a thermal element is slightly different. A heating element 13 located in a cooking chamber 15 is controlled by a contactor 85 embodying the usual actuating coil, and a movable armature core associated with a contact bridging member 87, which latter, together with cooperating contact members, is connected in series circuit with heating element 13 to control its energization.

Means for controlling the energization of the actuating coil of contactor 85 includes a thermal switch 89 comprising a thermal element 91, which is shown for illustrative purposes as a bimetal element having one end thereof secured to a contact terminal 93, while the free end thereof is adapted to engage with and be disengaged from a substantially fixed but adjustable contact member 94. The design and construction of the thermal switch is such that thermal element 91 is out of engagement with contact member 94 at all temperatures below a certain peak or maximum temperature on the order of 500° F. The connection of the thermal switch 89, preferably located in the cooking chamber 15 or in heat-receiving relation relative thereto, is such that when a certain temperature in either the cooking chamber or of the thermal element 91 has been reached, it operates to short-circuit the actuating coil of contactor 85, and in order to limit the current in the actuating coil, I provide a current-limiting resistor 95 in series circuit relation therewith.

Means for modifying the operation of thermal switch 89 includes a small auxiliary heater 97 located in heat-transmitting relation to element 91, and in order to provide proper cooperation of these two elements, I prefer to locate them in a small casing 99 in which the various elements may be properly supported.

Means for controlling the energization of heater 97 includes an auxiliary contactor 101 which includes, in addition to the usual actuating coil and movable armature core, a contact bridging member 103, and a second contact bridging member 105. Contact bridging member 103 cooperates in a manner well known in the art with a manually closable "start" type switch 107 to provide a holding circuit for the actuating coil of contactor 101, and a current-limiting resistor 109 is provided in this circuit. It is obvious that limiting resistor 95 could be omitted and resistor 109 could serve for both circuits. Contact bridging member 105 controls the energization of the adjustable auxiliary heater 97. It will be noted that in this system the thermal switch 89 controls both the main contactor 85 and the auxiliary contactor 101, effecting deenergization thereof by short circuiting the actuating coils of the respective contactors.

Referring now to Fig. 4 of the drawings, I have there illustrated a heating element 13 located in a cooking chamber 15 formed by walls 17. Energization of the heating element 13 is controlled by a main contactor 111 which comprises the usual actuating coil, a movable armature core and a contact bridging member 113 which cooperates with fixed contact members which are connected in series circuit with heating element 13 to energize the same.

Means for controlling the energization of contactor 111 comprises a thermal switch 115 located either in the cooking chamber 15 or in heat-receiving relation relative thereto, and a thermal element 117, shown in the form of a bimetal strip having one end thereof connected to a fixed contact terminal 119, and having a resilient contact strip or arm mounted thereon to engage with and be disengaged from a substantially fixed but adjustably mounted contact terminal 121. The design and construction of the thermal switch 115 is such that bimetal bar 117 is out of engagement with contact terminal 121 at all temperatures below a certain peak or maximum temperature, which may be on the order of 500° F. At this maximum temperature, engagement of the bar 117 and terminal 121 effects a short-circuit of the actuating coil of contactor 111, and in order to limit the current traversing this circuit, I provide a current-limiting resistor 123.

A modifying element for bimetal bar 117 is provided in the form of a small auxiliary heater 125 located closely adjacent to bimetal element 117, and in order to insure proper cooperation therebetween, I prefer to locate these elements in a suitable casing 127, which casing may be utilized to support the various elements of the thermal switch.

Means for controlling the energization of the adjustable auxiliary heater 125 comprises an auxiliary contactor 129 which includes, in addition to the usual actuating coil and movable armature, two contact bridging members 131 and 133. Contact bridging member 131 cooperates with a manually closable "start" type switch 135 to provide a holding circuit for the actuating coil of contactor 129 in a manner well known in the art. In series circuit with the manually actuable switch 135, there is connected a contact bridging member 137 actuated by the movable armature core of contactor 111. The design and construction of the second contact bridging member 137 is such that it engages its cooperating contact members when contactor 111 is energized.

The energizing circuit of adjustable heater 125 is controlled by contact bridging member 133 which cooperates with fixed contact members, the circuit through heater 125 being open when contactor 129 is energized.

Referring now again to Fig. 1 of the drawings, the various parts of the system are shown in the position which they will occupy when switches 11 and 21 have been closed and as long as the temperature in cooking chamber 15 has not reached a predetermined peak or maximum temperature. To start the operation of the system, the operator may close switches 11 and 21 and then momentarily depress push-button switch 53, to close an energizing circuit through actuating coil of contactor 47, and contact members 39 and 41. The bridging members of contactor 47 are thereby moved to the positions shown in Fig. 1 of the drawing, to open the energizing circuit through auxiliary heater 43 and to provide a holding circuit for contactor 47.

The temperature in cooking chamber 15 will be gradually increased, the rate of temperature rise being determined, in general, by the amount of heat generated by heating element 13, the design and construction of the oven walls 17, and the amount of food and specifically the amount of meat placed within the cooking chamber. At a certain temperature which, as has hereinbefore been stated, may be assumed to be on the order of 500° F., and which temperature can be determined by the adjustment of movable contact member 41, thermal element 35 will be disengaged from contact terminal 41, whereby the energizing circuits through the actuating coils of contactors 23 and 47 will be interrupted and both contactors will be deenergized. This results in the deenergization of heating element 13 by the action of contactor 23 and in the energization of auxiliary heating element 43 by reason of the engagement of contact bridging member 49 with its cooperating fixed contact members.

It is obvious that within a very short time after the deenergization of heating element 13, the temperature in the cooking chamber and of thermal element 35 will again decrease, that is, a momentary peak or maximum temperature only will be obtained in the cooking chamber. Let it be assumed for illustrative purposes that heating element 43 will reach its maximum operating temperature within, say, a few minutes after it is initially energized. At this time, the temperature in the cooking chamber 15 will have fallen by a very few degrees so that the thermal element 35 is subjected not only to the temperature of the cooking chamber but also to that of the adjacent heater 43, whereby it will be caused to open still more, that is, resilient contact 39 will be moved further away from contact terminal 41. Let it be assumed that it is desired to continue further cooking operation of the food at a temperature of, say 350° F. in the cooking chamber; auxiliary heater 43 will then be so adjusted as to provide an amount of heat sufficient to increase the temperature of thermal element 35 by 150°. As was hereinbefore stated, disengagement between elements 39 and 41 is effected at about 500°, and it is, therefore, clear that the temperature in the cooking chamber 15 must drop to a value of substantially 350° before re-engagement of resilient element 39 and contact terminal 41 occurs. When this does happen, actuating coil 25 is re-energized, resulting in reenergization of heating element 13, but it is to be noted that since the holding circuit of auxiliary contactor 47 was interrupted, contactor 47 will not be re-energized, the result being that heating element 43 continues to be energized irrespective of the subsequent intermittent engagement and disengagement of elements 39 and 41 of thermal switch 33, and the consequent intermittent sequential energization and deenergization of contactor 23 and, therefore, of heating element 13. This operation of contactor 23 causes the maintenance of a substantially constant average temperature in the cooking chamber which may be adjusted to any desired value within predetermined limits as it may be varied by the adjustment of contact terminal 41 and the amount of heat generated by auxiliary heater 43.

The starting and the operation of the system shown in Fig. 2 is substantially the same as that of the system of Fig. 1. In the system of Fig. 2, main contactor 55 controls the auxiliary contactor 61, but otherwise the results are the same. As the circuits controlled by the respective thermal switches 33 and 63 are such that they are interrupted by the opening of the thermal switches, no current limiting resistors are required.

Referring now to Fig. 3 of the drawings, deenergization of the main and of the auxiliary contactor coils is effected by short-circuiting the actuating coils so that current-limiting resistors are necessary in the circuits, but, in general, the method of starting and the operating cycle of the system shown in Fig. 3 are the same as that shown in Fig. 1.

Similarly, for the system shown in Fig. 4 of the drawings, the method of starting and of operation and the temperature cycle obtained is the same as was hereinbefore set forth for Fig. 2 of the drawings.

I have hereinbefore described a temperature cycle obtainable by the use of the systems embodying my invention, which temperature cycle included a momentary peak value and then a lower sustained or maintained value, but it is possible to obtain the maintained temperature cycle alone. This may be useful, for instance, in boiling at a temperature of about 212° F. or in baking at a substantially continuous temperature. If the operator desires to obtain a maintained temperature cycle only, he or she will not momentarily close the "start type" switches shown in the respective systems.

Referring to Fig. 1, for instance, if switch 53 is not closed momentarily, the auxiliary contactor 47 is not energized, and auxiliary heater 43 is energized simultaneously with the energization of heating element 13. If thermal switch 33 has been adjusted to disengage its cooperating contact members at, say, 500° F., and if it is desired to obtain a temperature of 300° F. in the cooking chamber, the heating element 43 is so adjusted to generate an amount of heat necessary to increase the temperature of element 35 by 200° F. Under these conditions, when the cooking chamber 15 has reached a temperature of 300° F., the thermal element 35 will have reached a temperature of 500° F., so that it will be actuated to its open position to deenergize main contactor 23 and, therefore, to deenergize heating element 13. This results in a reduction in the temperature of the cooking chamber, and at a certain lower value which may be on the order of 490° or 480°, depending upon the design and adjustment of the thermal switch 33, the thermal element 35 will again operate to its closed position to re-energize contactor 23. This cycle of operation of intermittent sequential energization and de-energization of the heating element will continue for as long as the operator may desire or the entire system may be deenergized by the operation of the clock controlled switch device 19.

Substantially the same comments apply with regard to the systems of Figs. 2 to 4, inclusive, if the operator should desire to obtain a maintained or sustained temperature cycle only in the cooking chamber.

The device embodying my invention thus provides relatively simple easily actuated and operated thermal electric means for obtaining any one of a plurality of different temperature cycles in the cooking chamber of an electric range. My system utilizes a main and an auxiliary contactor which are controlled either directly or in sequence by a thermal switch of relatively simple design, which thermal switch includes a modifying element in the form of an auxiliary heater to modify the temperature of the thermal element to a predetermined degree, the operating temperature of the thermal element remaining, however, substantially the same except as it may be modified by manual adjustment thereof.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber, a heating element therefor, and means to control the heating element to obtain a momentary peak temperature and then a maintained lower temperature in the cooking chamber, said means including a main contactor controlling the heating element, a thermal switch controlling the circuit of the contactor coil, responsive to chamber temperature and operable at the peak temperature value only, a thermal means affecting the thermal switch, control means for the thermal means, electric connections between the thermal switch, the main contactor and the control means for the thermal means whereby the thermal means is initially deenergized and the heating element is initially energized until a peak value of chamber temperature is reached whereupon the main contactor and the heating element is deenergized and the thermal means is energized, the chamber temperature then reaching a lower value determined by the heat input of the thermal means after which the thermal switch intermittently sequentially energizes and deenergizes the contactor coil and thereby the heating element to maintain said lower value of chamber temperature.

2. In an electric cooking appliance including a cooking chamber, a heating element therefor, and means to control the heating element to obtain a momentary peak temperature and then a maintained lower temperature in the cooking chamber, said means including a thermal switch responsive to chamber temperature and operable at a peak temperature only, a contactor controlling the heating element, an auxiliary heat source operatively associated with the thermal switch, a contactor for the auxiliary heat source, and connections between the thermal switch, the main contactor, the auxiliary heat source and the contactor for the auxiliary heat source whereby the heating element is initially energized and the auxiliary heat source is deenergized until a peak temperature in the cooking chamber is reached, the thermal switch then effecting deenergization of the main contactor coil and the energization of the auxiliary heat source until a lower temperature in the cooking chamber is reached whereafter the thermal switch intermittently energizes and deenergizes the contactor coil and thereby the heating element.

3. In an electric cooking appliance including a cooking chamber, a main heating element therefor, and means to control the heating element to obtain a momentary peak temperature and then a maintained lower temperature in the cooking chamber, said means including a main contactor for the heating element, a thermal switch subject to chamber temperature and operable at said peak temperature, an auxiliary heating element thermally associated with the thermal switch, an auxiliary contactor for the auxiliary heating element, and electric connections between the main and auxiliary contactors, the thermal switch and the auxiliary heating element whereby the main heating element is energized and the auxiliary heating element is deenergized until a peak temperature in the chamber is reached, the main heating element being then deenergized and the auxiliary heating element energized until a lower temperature value in the chamber is reached, the thermal switch then effecting energization and deenergization of the heating element to maintain a lower temperature in the cooking chamber.

4. In an electric cooking appliance including a cooking chamber, a main heating element therefor, and means to control the heating element to obtain a momentary peak temperature and then a maintained lower temperature in the cooking chamber, said means including a main contactor for the heating element, a thermal switch subject to chamber temperature and operable at said peak temperature, connected to control the main contactor and thereby the energization and deenergization of the heating element, an auxiliary heating element thermally associated with the thermal switch, an auxiliary contactor for controlling the energization of the auxiliary heating element and a manually actuable switch for the auxiliary contactor to cause it to initially deenergize the auxiliary heating element until a peak chamber temperature is reached whereupon the thermal switch operates to deenergize the main heating element and to energize the auxiliary heating element and to maintain the energization of the auxiliary heating element irrespective of opening and closing movements of the main contactor caused by operation of the thermal switch.

5. A device as set forth in claim 3, in which the main contactor controls the circuit of the coil of the auxiliary contactor.

6. An appliance as set forth in claim 3, in which the auxiliary contactor is controlled by the thermal switch.

7. In an electric cooking appliance including a cooking chamber and a heating element therefor, means for obtaining a momentary peak temperature and then a maintained lower temperature in the cooking chamber, said means including a main contactor controlling the heating element, a thermal switch controlling the main contactor, responsive to chamber temperature and operable at said peak temperature value, an auxiliary heating element thermally associated with the thermal switch and adapted to provide an amount of heat thereto equal to substantially the difference between the peak temperature value and the maintained temperature value, an auxiliary contactor controlling the energization of the auxiliary heating element, and electric connections between the thermal switch and the contactor coils whereby the main heating element is energized and the auxiliary heating element is deenergized until a peak temperature value in the chamber is reached whereupon the main heating element is deenergized and the auxiliary heating element is energized, the thermal switch thereafter being operative to effect sequential energization and deenergization of the main contactor only to maintain substantially said lower maintained temperature in the cooking chamber.

8. In an electric cooking appliance including a cooking chamber, a main heating element therefor, means for obtaining either a momentary peak temperature and then a lower maintained temperature cycle or a maintained temperature cycle in the cooking chamber, said means including a main contactor controlling the energization of the main heating element, a thermal switch subject to chamber temperature and controlling the main contactor, an auxiliary heating element thermally associated with the thermal switch, an auxiliary contactor controlling the energization of the auxiliary heating element, electric connections between the contactors, the thermal switch and the auxiliary heating element, and means for causing the auxiliary contactor to occupy one position or another at the will of an operator whereby in one position thereof the thermal switch energizes the main contactor and thereby the main heating element to raise the chamber temperature to a peak value, then deenergizes the main heating element and energizes the auxiliary heating element, then intermittently energizes and deenergizes the main contactor to thereby sequentially energize and deenergize the main heating element to maintain a lower average temperature in the cooking chamber and if the auxiliary contactor occupies another position the thermal switch intermittently energizes and deenergizes the main contactor to sequentially energize and deenergize the main heating element to maintain a predetermined lower average value of temperature in the chamber.

HERMAN M. BIEBEL.